Figure 6:
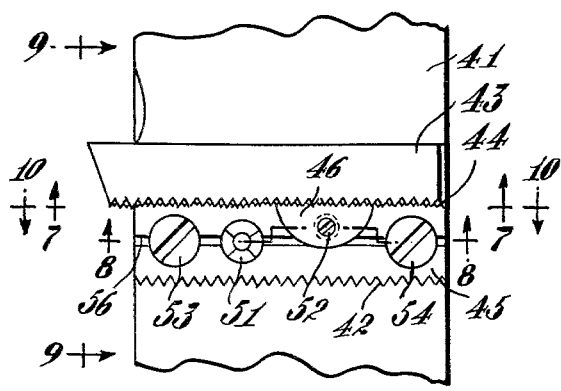

Nov. 2, 1965  T. V. WILLIAMS  3,214,825
TOOL AND BIT
Filed Dec. 18, 1963  2 Sheets-Sheet 1
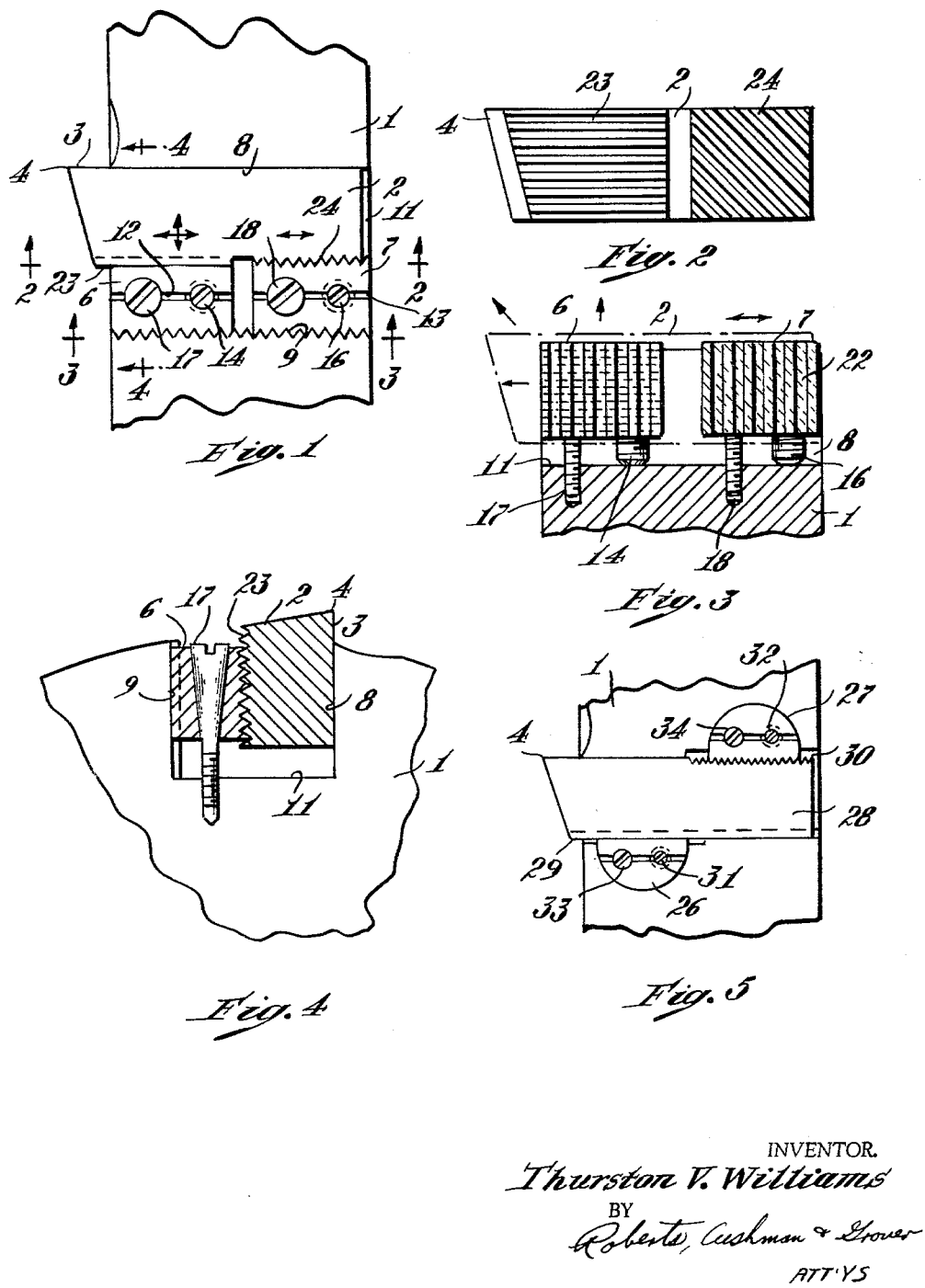
INVENTOR.
Thurston V. Williams
BY
Roberts, Cushman & Grover
ATT'YS United States Patent Office 3,214,825
Patented Nov. 2, 1965

3,214,825
TOOL AND BIT
Thurston V. Williams, Wilton, N.H., assignor to The O.K. Tool Company, Inc., Milford, N.H., a corporation of New Hampshire
Filed Dec. 18, 1963, Ser. No. 331,460
15 Claims. (Cl. 29—96)

This invention relates to metal-cutting tools such as milling cutters, lathes, end-facing tools, etc. and particularly to a tool comprising a carrier, such as a rotary head having a recess to receive a bit, the recess having outlets through two adjacent faces, the peripheral and end faces in the case of a rotary head, and the bit having two cutting edges disposed at an angle to each other and projecting through the aforesaid outlets respectively. The cutting edges meet at a corner which may be either sharp or rounded.

Objects of the invention are to provide means which adjusts the bit transversely of each cutting edge to vary the extent to which the bit projects through the aforesaid outlets respectively, which permits one adjustment without changing the other adjustment, which permits both adjustments conjointly, which permits both adjustments from the same side of the tool, which permits positively locking the bit in place from the same side of the tool, which requires little machine work on the carrier, which is simple and economical to produce, and which is durable and reliable in use.

In one aspect this invention involves a tool comprising a carrier having a lateral bit recess containing a bit and locator means comprising two parts, the locator means being keyed to the recess by serrations or otherwise to permit movement of both parts in a direction transversely of the bottom of the recess while preventing movement along the bottom, one of the parts being keyed to the bit to permit movement of the bit relatively to the part along the bottom while preventing relative movement transversely of the bottom, the other part being keyed to the bit to permit movement of the bit relative to the bottom only obliquely to the bottom, means carried by the locator means for adjusting the parts in the aforesaid direction, and means for locking the bit and parts in adjusted position. Preferably the last aforesaid means is carried by the locator means, the aforesaid parts are located on the same side of the bit, and the parts are keyed to the bit by means of serrations, the serrations on one part extending along the bottom and the serrations on the other part extending obliquely to the bottom. While each of the parts may be keyed to the recess directly, preferably one part is keyed to the recess through the medium of the other part. In the preferred embodiment the serrations on the bit for the aforesaid parts are located on the same side of the bit and in superposed relationship.

In a more specific aspect the locator means has a first set of serrations extending transversely of the bottom of the recess to permit movement in a direction transversely of said bottom while preventing movement along the bottom, one of the parts has a second set of serrations extending lengthwise of said bottom to permit movement of the bit relative to the part along the bottom while preventing relative movement transversely of the bottom, and the other part has a third set of serrations extending obliquely to the bottom to permit movement of the bit relative to the part obliquely to said bottom. In the preferred embodiment one of the aforesaid parts has a semi-cylindrical recess in its bit face and the other part has the same semi-cylindrical shape to fit in the semi-cylindrical recess.

A sub-combination of the invention involves a cutting bit having two cutting edges disposed at an angle to each other and two sets of side serrations, one set extending transversely of one cutting edge and the other set extending obliquely to one cutting edge. Preferably one set of serrations extends substantially parallel to one cutting edge and the other set extends obliquely to both cutting edges, with the serrations of the oblique set extending parallel to a line bisecting the angle between said edges. In the preferred embodiment both sets are on the same side of the bit and are superposed.

Another sub-combination of the invention comprises a bit locator having a bit face and an opposite face, with a first set of serrations on the latter face, the locator comprising two parts, one part having a second set of serrations on its bit face extending transversely of said serrations and the other part having a third set of serrations on its bit face extending obliquely to the serrations of both of said sets.

Figure 7:
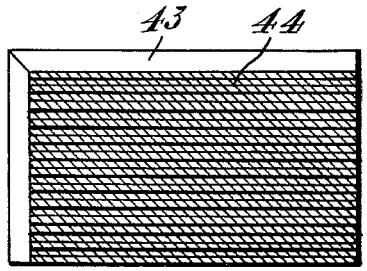
Figure 8:
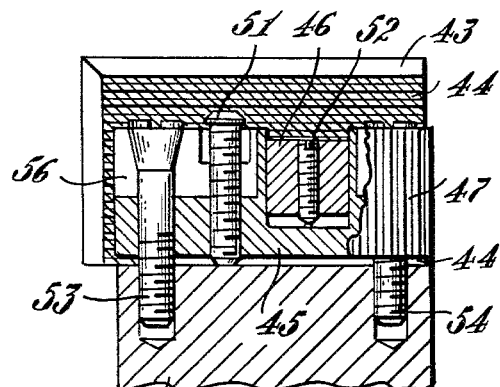
Figure 9:
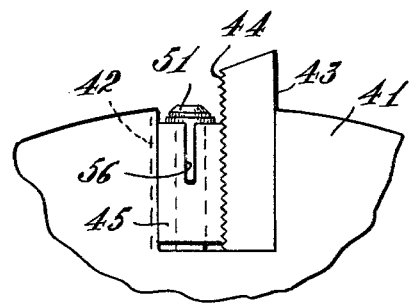
Figure 10:
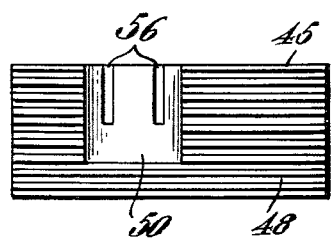
Figure 11:
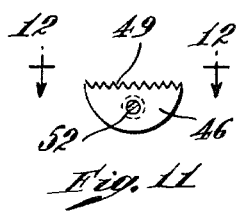
Figure 12:
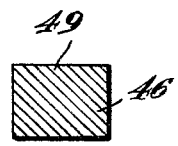

For the purpose of illustration typical embodiments of the invention are shown in the accompanying drawings in which FIG. 1 is a plan view of one embodiment;
FIG. 2 is a view of the bit from the line 2—2 of FIG. 1;
FIG. 3 is a view of the locator means from the line 3—3 of FIG. 1;
FIG. 4 is a section on line 4—4 of FIG. 1;
FIG. 5 is a plan view of a modification;
FIG. 6 is a plan view of a third embodiment;
FIG. 7 is a view of the cutter from the line 7—7 of FIG. 6;
FIG. 8 is a section on the line 8—8 of FIG. 6;
FIG. 9 is a side view from the line 9—9 of FIG.6;
FIG. 10 is a view of one part of the locator from the line 10—10 of FIG. 6;
FIG. 11 is a plan view of the other part of the locator; and
FIG. 12 is a view from the line 12—12 of FIG. 11.

The particular embodiment of the invention shown in FIGS. 1 to 4 comprises a rotary carrier 1 such as a milling head, a bit 2 having a peripheral cutting edge 3 and an end cutting edge 4 and locator means comprising two parts 6 and 7, the bit and locator means being disposed in a recess in the carrier 1 having forward and rearward sides 8 and 9, a bottom 11, and peripheral and side outlets through which said edges project respectively. The parts 6 and 7 have bifurcations 12 and 13 extending from their outer ends part way toward their inner ends. Screws 14 and 16 extend through the parts and seat on the bottom 11 to adjust the parts relative to the bottom of the recess, and tapered screws 17 and 18 extend through the bifurcations and thread into the carrier 1 to expand the bifurcations and lock the parts in adjusted position.

The face 9 of the recess has serrations extending perpendicularly to the bottom of the recess and the parts 6 and 7 have interfitting serrations 21 and 22 so that the parts can move relatively to the carrier only perpendicularly to the bottom 11 of the recess. The forward end of the bit 2 has serrations 23 extending lengthwise of the bottom of the recess and the locator part 6 has interfitting serrations The rearward end of the bit 2 has serrations 24 extending obliquely to the bottom of the recess and the locator part 7 has interfitting serrations.

To adjust the extent to which the cutting edges 3 and 4 project from the recess the screws 17 and 18 are loosened to unlock the parts 6 and 7. By adjusting the screw 14, which bears on the bottom of the recess, the bit is adjusted radially so as to project more or less through the peripheral outlet of the recess. By rotating the screw 16 the bit is adjusted lengthwise of the bottom 11 and axially of the carrier 1, thereby to project more or less through the side outlet of the recess. Turning the screw 16 does not adjust the bit radially of the carrier because the serrations 23 prevent radial movement of the bit relatively to the part 6. After the bit has been adjusted axially and radially to the desired extent the screws 17 and 18 are tightened to lock the parts in place.

The modification shown in FIG. 5 is like that shown in FIGS. 1 to 4 except in that the locator parts 26 and 27, corresponding to 6 and 7 of the first embodiment, are located on opposite sides of the bit 28 and are keyed to the carrier 1 by being made semi-cylindrical to fit in semi-cylindrical recesses in the carrier instead of by serrations. The part 26 and bit 28 have interfitting serrations 29 extending axially of the carrier, corresponding to the serrations 23 of the first embodiment, and the abutting faces of the part 27 and bit 28 have oblique serrations 30 corresponding to the oblique serrations 24 of the first embodiment. The screws 31 and 32 correspond to 14 and 16 of the first embodiment and the screws 33 and 34 correspond to 17 and 18. By turning the screw 31 the bit is adjusted radially and by turning the screw 32 it is adjusted axially of the carrier 1 as in the first embodiment. After the bit is properly adjusted the screws 33 and 34 are tightened to lock the parts in adjusted position.

In the embodiment shown in FIGS. 6 to 12 the carrier 41 is exactly like the carrier of the first embodiment, having radial serrations 42 corresponding to the serrations 9 of the first embodiment. On its rearward face the bit 43 has two sets of serrations 44, one set extending axially of the carrier, corresponding to serrations 23 of the first embodiment, and another set extending obliquely, corresponding to set 24 of the first embodiment. However instead of locating the two sets of serrations on different parts of the bit they are superposed throughout the entire rear face of the bit. The locator comprises two parts 45 and 46. The rearward face of the locator has radial serrations 47 meshing with the carrier serrations 42 and the forward face of the part 45 has axial serrations 48 meshing with the axial serrations of the bit. The part 46 has oblique serrations 49 on its forward face meshing with the oblique serrations on the bit. The part 46 is semi-cylindrical and fits in a semi-cylindrical recess 50 in the part 45. The part 45 carries a screw 51 seating on the bottom of the carrier recess for adjusting the part 45 radially with respect to the carrier. The part 46 carries a screw 52 for adjusting the part 46 relatively to the part 45. Screws 53 and 54 extend through the bifurcation 56 in the part 45 and thread into the carrier 41. These screws have tapered heads to expand the bifurcation and lock the parts in adjusted position.

In the third embodiment shown in FIGS. 6 to 12 the preferred procedure in adjusting the bit is to loosen the lock screws 53–54 and then turn the screw 51 to adjust the bit radially of the carrier. Then the screw 52 is turned to adjust the bit lengthwise of the bottom of the recess in the carrier by means of the oblique serrations. This latter adjustment does not move the bit radially because the bit is interlocked with the part 45 against radial movement by virtue of the interfitting serrations on the bit and part 45 which extend parallel to the bottom of the recess in the carrier.

From the foregoing it will be evident that this invention provides means for adjusting a bit transversely of each of two cutting edges to vary the extent to which the bit projects through outlets in two adjacent faces of the carrier, which permits one adjustment without changing the other adjustment, which permits both adjustments from the same side of the tool, which permits positively locking the bit in place from the same side of the tool and which requires little machine work on the carrier, namely the aforesaid serrations in addition to the recess or recesses in the carrier.

It should be understood that the present disclosure is for the purpose of illustration only and that this invention includes all modifications and equivalents which fall within the scope of the appended claims.

I claim:

1. A tool comprising a carrier having a lateral bit recess, in said recess a bit and locator means comprising two parts, the locator means being keyed to the recess to permit movement in a direction transversely of the bottom of the recess while preventing movement of both parts along the bottom, one of the parts being keyed to the bit to permit movement of the bit relative to the part along said bottom while preventing relative movement transversely of the bottom, the other part being keyed to the bit to permit movement of the bit relative to the part obliquely to said bottom, means carried by the locator means for adjusting the parts in said direction, and means for locking the bit and parts in adjusted position.

2. A tool according to claim 1 wherein said last means is carried by the locator means.

3. A tool according to claim 1 wherein said parts are located on the same side of the bit.

4. A tool according to claim 1 wherein each of said parts is keyed to the recess directly.

5. A tool according to claim 1 wherein one of said parts is keyed to the recess through the medium of the other part.

6. A tool comprising a carrier having a lateral bit recess, in said recess a bit and locator means comprising two parts, the locator means having a first set of serrations extending transversely of the bottom of the recess to permit movement in a direction transversely of said bottom while preventing movement along the bottom, one of the parts having a second set of serrations extending lengthwise of said bottom to permit movement of the bit relative to the part along the bottom while preventing relative movement transversely of the bottom, the other part having a third set of serrations extending obliquely to the bottom to permit movement of the bit relative to the part obliquely to said bottom, means carried by the locator means for adjusting the parts in said direction, and means for locking the bit and parts in adjusted position.

7. A tool according to claim 6 wherein the serrations on the bit for said parts respectively are located on the same side of the bit and in superposed relationship.

8. A tool according to claim 6 wherein one of said parts has a semi-cylindrical recess in its bit face and the other part has the same semi-cylindrical shape to fit in the semi-cylindrical recess.

9. For use in a tool according to claim 1, a cutting bit having two cutting edges disposed at an angle to each other and two sets of side serrations, one set extending transversely of one cutting edge and the other set extending obliquely to one cutting edge.

10. A bit according to claim 9 wherein one set of serrations extends substantially parallel to one cutting edge and the other set extends obliquely to both cutting edges.

11. A bit according to claim 9 wherein said sets are on the same side of the bit.

12. A bit according to claim 11 wherein said sets are superposed.

13. For use in a tool according to claim 6, a bit locator having a bit face and an opposite face, said first set of serrations being disposed on the latter face, the locator comprising two parts having said second and third sets of serrations on their bit faces respectively.

14. A bit locator according to claim 13 wherein one of said parts is carried by the other part.

15. A bit locator according to claim 14 wherein said one part is semi-cylindrical and the other part has an interfitting semi-cylindrical recess.

No references cited.

WILLIAM W. DYER, Jr., *Primary Examiner.*